United States Patent [19]

Fried

[11] 4,028,967

[45] June 14, 1977

[54] WATCH JEWELING TOOL

[76] Inventor: Henry B. Fried, 69-53 180 St., Fresh Meadows, N.Y. 11365

[22] Filed: Mar. 30, 1976

[21] Appl. No.: 672,003

[52] U.S. Cl. .......................................... 81/7; 29/231

[51] Int. Cl.² ........................ B23P 5/00; G04D 3/04

[58] Field of Search .................... 81/7, 3 F; 29/231; 100/289

[56] References Cited

UNITED STATES PATENTS

| | | | |
|---|---|---|---|
| 892,309 | 6/1908 | Russell | 29/231 |
| 1,543,088 | 6/1925 | Ballard | 29/231 |
| 2,071,401 | 2/1937 | Hansen | 29/231 |

*Primary Examiner*—Al Lawrence Smith
*Assistant Examiner*—Roscoe V. Parker
*Attorney, Agent, or Firm*—Schwartz & Weinrieb

[57] ABSTRACT

A tool for the precision press-fitting of watch bearings, watch hands, collets and other precision press-fit parts. The tool is used in conjunction and as an attachment with traditional watchmakers' staking sets. The tool consists of a cylindrical metal rod, hollow and slit at its lower end to accommodate friction-fit pushers of various end-dimensions. The cylindrical rod is threaded in metrical or inch pitch for one-third of its lower length to accommodate a knurled disk upon which are marked the divisions of a linear unit, similar to the thimble of a micrometer. At its upper end, the rod is milled to a short rectangular section. Upon this rectangular end is positioned a flat metal clamp with close fitting but not tight, rectangular hole. The clamp is split at its outer end, forming two legs which are form-bent downward to straddle the gooseneck of a staking set. The threaded, micrometer nut is threaded up against the bottom of the staking set's hollow punch-guide. In this set-up, any further manual movement of the knurled nut raises or lowers the cylindrical rod, thus performing the press-fitting functions.

7 Claims, 4 Drawing Figures

WATCH JEWELING TOOL

BACKGROUND OF THE INVENTION

This invention relates to pressure tools used to insert friction, press-fit bearings of jewel material, metal or other materials into clock or watch or instrument plates. Other parts such as collets, hands for example, onto clocks, watches or instruments can be similarly fitted. Modern bearings of all materials are press-fit into tightly fitting holes in the plates of watches, clocks or instruments. Many bearings are made of synthetic jewel material. Their position relative to the height at which they must be fixed is directly related to the height of the axle of the wheel or lever contained in the bearing hole. Precision positioning is necessary so that the freedom of the pivotal movement of the turning part and axle is not restrained as it would be if the bearing height be insufficient. If the end-shakes are excessive, the axle will shift vertically and cause its attached member to fall out of engagement with its connecting neighbor.

Also, many bearings, being made of jewel material are delicate and brittle. Sudden or excessive pressure would cause fracture or shattering of these bearings.

Existing tools which insert these bearings are complicated and very expensive. Such tools insert these bearings by levered hand pressure governed only by a stop-lock adjustment. Thus, only one hand is left to guide or manipulate the plate into which the bearing is being inserted. This type of pressure does not allow for a delicacy of touch or feel, often the difference between a successful operation and a shattered bearing. Also, the large expense involved makes its use prohibitive to the average watch and clock or instrument maker. In view of the foregoing, the main object of this invention is to provide a bearing inserting device that is simple, safe and allows both hands to guide the plate and allow for close-up judgment of the pressure to be applied, it allows pressure to be applied by gradual thread-bearing pressure and the design of the tool is such that it allows it to be made at a reasonable price, available to any mechanic involved in such work.

A significant feature of this invention is that its pressure upon the object to be press-fit is by screw-feed. By this method, the operator controls the gradual pressure required and yet obtains the sense perception which ensures the insertion without fracture.

Also, the pushers can be threaded with a metric pitch of either one or two threads per millimeter. The threaded disc which governs the pressure and depth to which the part to be pressed-fit is subjected can have on its upper surface the divisions of a full millimeter, half millimeter, inches or any division of a linear unit measurement. This serves as an accurate reference when endshakes or heights to which a press-fit part is to alter or adjust.

DESCRIPTION OF THE INVENTION

Figure 1A:
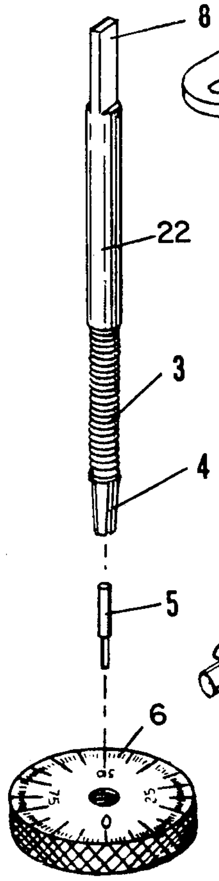
FIG. 1A is an exploded view of selected tool parts of FIG. 1.

Referring to the figures, the traditional form of a watchmakers' staking set 1, allows cylindrical rod punches, drills of a precise diameter to fit into its hollow guide post 17. A steel punch, 2, or of any other metal is inserted in the guide post 17. Then the calibrated, knurled nut, 6, is threaded onto the threaded section 3 of the punch 2. Into the hollow, slit lower, threaded end of this punch is fitted one of the pushers 11, 12, 13, 14, whichever is just smaller than the diameter of the bearing to be inserted. These pushers remain fixed within the clutch-fitting slit 4 of the punch.

At the upper end of this punch is a short rectangular section, 8. Fitted over this rectangular section is the fixing clamp, 7, whose rectangular hole, 10, allows this to be positioned onto the punch. The fixing clamp, 7, has two arms or extensions which are adjusted to straddle the gooseneck of 1, the staking set.

The fixing clamp, 7, when in position, prevents any twisting movement of the punch. This allows both hands to operate close to one another, providing precision and stability for other delicate manipulations.

Figure 2:
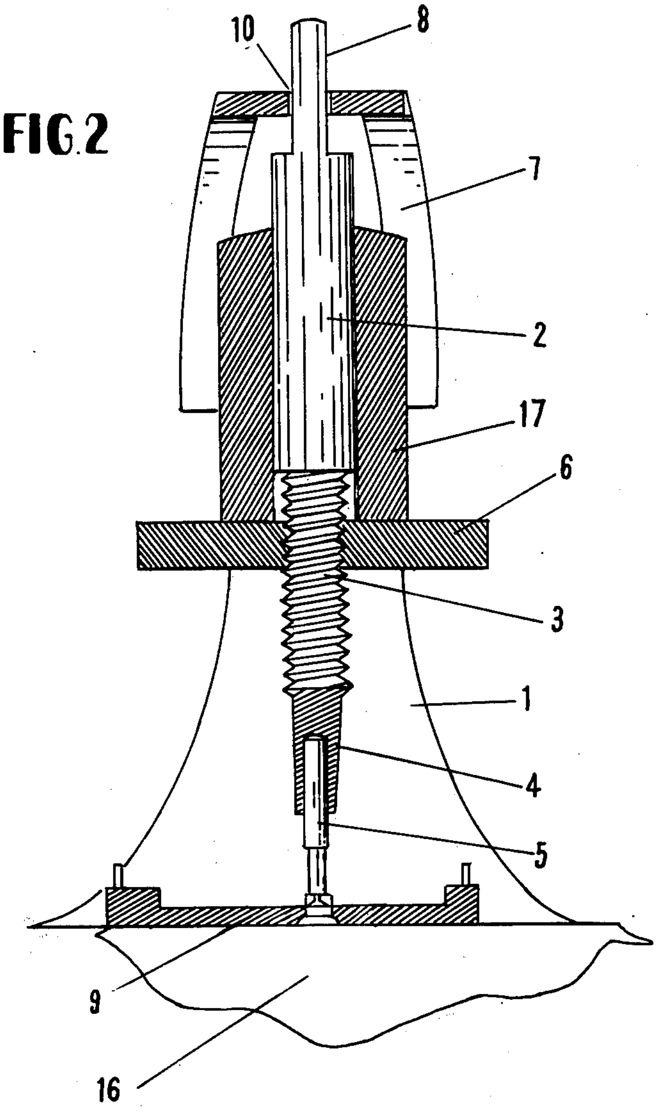
FIG. 2 is an end view elevation of the tool of FIG. 1 with parts shown in cross-section; and, FIG. 3 is an enlarged view of the inset portion of FIG. 2.

With a pusher 5 or 11, 12, 13, 14, pressing on the bearing 15, turning the nut, 6, from left to right causes the punch to descend, pushing the bearing into its tight hole, once the bearing 15 rests upon a train bridge 9 and anvil 16 and the nut 6 has been threaded upon section 3 of punch 2 so as to abut the bottom portion of post 17, as shown in FIG. 2. The depth to which the bearing is to be pushed depends on the fractions of a millimeter or other linear unit to which the nut, 6, is turned.

Figure 1:
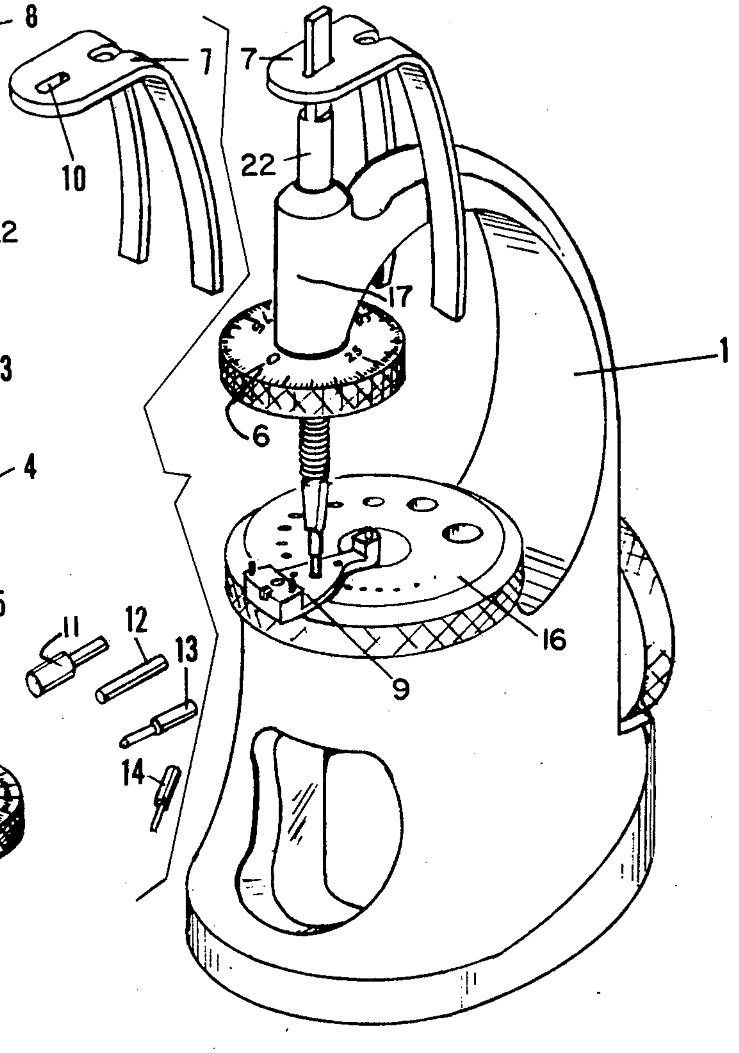
FIG. 1 is perspective view of one embodiment of the present invention.
Figure 3:
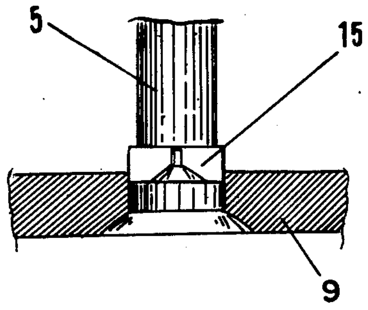

Shown in FIG. 1, is 9, a typical train bridge of a watch movement resting on the anvil, 16, of the staking set. Shown in greater detail in FIG. 2 is the split, clutch fitting end, 4, one of the pushers, 5, a jewel or bearing, 15, also shown in FIG. 3, the watch train bridge, 9, which is resting on the steel anvil, 16, of the staking set, 1.

In FIG. 2, the punch guide, 17, is shown in section for better perception of how the punch, 2, is freely slidable accommodated therein. For the same reason, the top of the punch-clamp, 7, is also shown in section.

In order to press-fit bearings of different diameters, pushers, 11, 12, 13, 14 are shown although numerous others of various dimensions can be used as, for example, 11, shows a pusher which must be larger than the bearing it is to bear against or one to press-fit hands, or collets onto a part of a timepiece or instrument. In certain instances, the bearing may have to be pressed to a level below the edge of its hole in the plate. In such a case, a pusher just a little smaller than the diameter of the bearing is chosen. In other cases, when a reduction in endshake is desired, the bearing plate is turned over and the tool exerts an exact amount of pressure to move the bearing the precise amount, governed by the movement of the metered nut, 6.

To use the device, the bearing, 15, with its chamfered edge is placed loosely over the hole in the plate, 9. The pusher, 5, or any appropriate pusher of correct diameter is then activated downward by left to right movement of the metered nut, 6, to a predetermined depth as noted hereinabove. Afterwards, the micrometer nut, 6, is turned in the opposite direction so as to thread the same onto a lower portion of section 3 of punch 2 whereby the nut, punch and pusher may be manually raised away from bridge 9 and anvil 16, as a result of the slidable movement of punch 2 within post 17, until the nut 6 again abuts the lower portion of post 17. The two-armed punch fixing clamp, 7, prevents the punch from turning. Thus one hand may hold the part to be manipulated while the other hand delicately turns metered but to the desired amount.

I claim:

1. A watch-jeweling tool, comprising:

a standard having a base portion, an anvil supported upon said base portion, an upstanding neck portion fixedly secured upon said base portion the free end of which over-hangs said anvil, and a guide post fixedly secured to the free end of said over-hanging neck portion so as to be disposed above said anvil;

an elongated punch having a central portion slidably disposed within said guide post of said standard, a member fixedly secured to said central portion at one end thereof, and a threaded portion fixedly secured to said central portion at the other end thereof, said member, said central portion, and said threaded portion being disposed serially along the longitudinal axis of said punch;

a pusher disposed within said threaded end portion of said punch and adapted to cooperate with said anvil of said standard in performing a press-fitting operation;

a manually operable nut threadedly engaged upon said threaded portion of said punch and adapted to abut the lower portion of said guide post; and a clamp having means slidably engaging said member of said punch and additional means engaging said neck portion of said standard for preventing rotation of said punch as said nut is rotated in order to threadedly actuate said punch and move the same along the longitudinal axis thereof when said nut abuts said lower portion of said guide post and said pusher is operatively engaged with said anvil.

2. A tool as set forth in claim 1, wherein:

said punch is made of metal.

3. A tool as set forth in claim 2, wherein:

said metal is steel.

4. A tool as set forth in claim 1, wherein:

said member of said punch is an upstanding projection having a rectangular cross-section; and said means of said claim slidably engaging said punch member comprises means defining a rectangular-shaped aperture within said clamp which is adapted to be fitted over said rectangular projecting member.

5. A tool as set forth in claim 1, wherein:

said end portion of said punch, within which said pusher is disposed, is longitudinally split; and said pusher is disposed within said split end of said punch by means of a friction-fitting.

6. A tool as set forth in claim 1, wherein:

the upper surface portion of said nut is calibrated with marked divisions thereon which correspond to the thread pitch of said threaded portion of said punch and that of said nut, whereby the rotation of said nut may be readily corresponded to the linear displacement of said punch toward said anvil.

7. A tool as set forth in claim 1, wherein:

said additional means of said clamp comprises a pair of legs which straddle said neck portion of said standard.

* * * * *